(12) United States Patent
Yunfeng et al.

(10) Patent No.: US 9,670,303 B2
(45) Date of Patent: *Jun. 6, 2017

(54) ALKYL PHENOLIC RESIN AND METHOD OF PREPARATION THEREOF

(71) Applicant: Sino Legend (China) Chemical Co. Ltd., Zhangjiagang, Jiangsu Province (CN)

(72) Inventors: Fan Yunfeng, Zhangjiagang (CN); Yang Quanhai, Zhangjiagang (CN)

(73) Assignee: SINO LEGEND (ZHANGJIANGANG) CHEMICAL CO. LTD., Zhangjiagang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,304

(22) Filed: Aug. 6, 2015

(65) Prior Publication Data

US 2015/0337069 A1 Nov. 26, 2015

Related U.S. Application Data

(63) Continuation of application No. 14/064,708, filed on Oct. 28, 2013, now Pat. No. 9,133,294, which is a continuation-in-part of application No. PCT/CN2012/081500, filed on Sep. 17, 2012.

(51) Int. Cl.
| | |
|---|---|
| *C08G 8/04* | (2006.01) |
| *C08G 8/10* | (2006.01) |
| *C08L 61/06* | (2006.01) |
| *C08L 9/00* | (2006.01) |
| *C10M 107/32* | (2006.01) |
| *C09D 109/00* | (2006.01) |
| *C09J 109/00* | (2006.01) |
| *C08L 21/00* | (2006.01) |
| *C08L 7/00* | (2006.01) |

(52) U.S. Cl.
CPC ............ *C08G 8/10* (2013.01); *C08L 7/00* (2013.01); *C08L 9/00* (2013.01); *C08L 21/00* (2013.01); *C08L 61/06* (2013.01); *C09D 109/00* (2013.01); *C09J 109/00* (2013.01); *C10M 107/32* (2013.01)

(58) Field of Classification Search
CPC . C08J 3/11; C08J 5/24; C08J 2361/06; C08G 8/10; C08L 9/00; C08L 61/06; C08L 21/00; C08L 2666/16; C08K 5/09
USPC .......... 528/141, 143, 165; 524/511; 527/137
See application file for complete search history.

(56) References Cited

U.S. PATENT DOCUMENTS

| | | | |
|---|---|---|---|
| 3,962,156 A * | 6/1976 | Harrop | C08G 14/06 525/133 |
| 4,022,942 A | 5/1977 | Anderson et al. | |
| 4,092,367 A † | 5/1978 | Bridwell | |
| 4,146,512 A † | 3/1979 | Weaver | |
| 7,772,345 B2 | 8/2010 | Banach et al. | |
| 2007/0060718 A1 | 3/2007 | Juhue et al. | |
| 2015/0112023 A1 | 4/2015 | Banach et al. | |

FOREIGN PATENT DOCUMENTS

| | | |
|---|---|---|
| CN | 1863832 A | 11/2006 |
| CN | 101161616 B | 12/2010 |
| WO | WO-2009/155747 † | 12/2009 |

* cited by examiner
† cited by third party

*Primary Examiner* — Shane Fang
(74) *Attorney, Agent, or Firm* — Westerman, Hattori, Daniels & Adrian, LLP

(57) ABSTRACT

Described herein are alkyl phenolic resins and methods of producing them. The content of residual phenol in the alkyl phenolic resin may be less than about 2% w/w, the softening point of the alkyl phenolic resin may be about 85° C. to about 105° C., the tackiness of the alkyl phenolic resin may be about 8 N to about 25 N, the alkyl group of the alkyl phenol may have 6-12 carbon atoms, and the content of 4-(1,1,3,3-tetramethylbutyl) phenol in the alkyl phenol may be from about 0% to about 85% w/w. The invention also relates to a use of the alkyl phenolic resin as rubber tackifier.

10 Claims, No Drawings

ALKYL PHENOLIC RESIN AND METHOD OF PREPARATION THEREOF

RELATED APPLICATIONS

This application is a Continuation of Ser. No. 14/064,708 filed Oct. 28, 2013 which claims the benefit and is a continuation in part of PCT International Application number PCT/CN2012/081500, filed Sep. 17, 2012, the contents of which are hereby incorporated by reference.

TECHNICAL FIELD

In certain embodiments, the invention relates to an alkyl phenolic resin with low quantities of residual phenol. In certain embodiments, the invention relates to methods of preparing the inventive alkyl phenolic resin. In certain embodiments, the invention relates to the use of the alkyl phenolic resin as rubber tackifier. In certain embodiments, the invention relates to rubber compounds comprising the alkyl phenolic resin.

BACKGROUND OF THE INVENTION

Alkyl phenols are important intermediates in the synthesis of raw materials for the production of fine chemicals. Alkyl phenols may be synthesized by reacting an alkene and a phenol in the presence of acidic catalyst. Alkyl phenols have broad applications in the production of non-ionic surfactants, anti-oxidants, oil additives, phenolic resin, and so on. An important alkyl phenol is p-tert-octyl phenol [PTOP, or 4-(1,1,3,3-tetramethylbutyl) phenol] because of its use in the production of phenolic resins; p-tert-octyl phenolic resin is widely used as rubber tackifier to produce rubber products, such as tires.

As described in CN101161616A, PTOP may be synthesized as follows: (a) Di-isobutylene (DIB) is obtained by the selective polymerization of isobutylene. The main components of di-isobutylene synthesized in this way are 2,4,4-trimethyl-1-pentene and 2,4,4-trimethyl-2-pentene. (b) DIB and phenol are reacted under acidic conditions to obtain an alkyl phenol with a highly branched alkyl chain.

However, isobutylene has broad applications in, for example, the production of butyl rubber, oil additives, methyl tert-butyl ether (MTBE), isobutyl alcohol, and other chemicals. Therefore, the supply of isobutylene for DIB production is scarce.

In the rubber industry, p-tert-octyl phenolic resin is often used as a tackifying resin, which usually contains certain amount (2-6% w/w) of residual, free PTOP due to synthetic limitations. Because PTOP is a pollutant, reducing the content of free PTOP in the resin is an important industrial goal. Practical experience proves that increasing the aldehyde-phenol ratio during resin production may reduce the content of free PTOP. However, the application of alkyl phenolic resin in the rubber industry dictates that the softening point of the resin be between 85° C. and 105° C., which facilitates the mixing and dispersion of the alkyl phenolic resin in rubber matrix, improving the rubber tackiness. Traditionally, the aldehyde-phenol molar ratio during synthesis of p-tert-octyl phenolic resin is between 0.7 and 0.9. In fact, when this ratio is above 0.8, the resin's softening point is often above 105° C. Hence, by known methods, it is impossible to reduce the residual PTOP content in the resin by increasing the aldehyde-phenol ratio. In addition, the decrease of free phenol content also improves the tackifying effect of the resin.

U.S. Pat. No. 7,772,345B2 describes a means of reducing free alkyl phenol content in alkyl phenolic resin by reacting vinyl compounds and free alkyl phenol. However the dosage of vinyl compounds is relatively large, and oligomers that do not contribute to the tackifying property will be produced at high temperatures.

CN 1863832A mentions the use of fatty acids to plasticize tackifying resin, thereby increasing the aldehyde-phenol ratio during reaction in order to reduce free phenol. But fatty acids are detrimental to rubber tackiness, and fatty acids will react with zinc oxide in the rubber formulation step, influencing the vulcanization process.

Therefore, it is desirable to offer an alkyl phenolic resin that has less than 2% (w/w) of residual phenol and properties (such as tackiness and softening point) suitable for use in rubber compositions.

SUMMARY OF THE INVENTION

In certain embodiments, the invention relates to a method, comprising:
contacting a first phenol and a second phenol with an aldehyde at a first temperature for a first amount of time, thereby forming an alkyl phenolic resin,
wherein
the first phenol is an alkyl phenol;
the second phenol is different from the first phenol; and
the second phenol is present in a concentration from about 0% to about 10% by weight of total phenol.

In certain embodiments, the invention relates to an alkyl phenolic resin made by any one of the aforementioned methods.

In certain embodiments, the invention relates to a composition, wherein the composition consists essentially of a polycondensation product of (i) a first phenol and a second phenol with (ii) an aldehyde;
the first phenol is an alkyl phenol;
the second phenol is different from the first phenol; and
the second phenol is present in a concentration from about 0% to about 10% by weight of total phenol.

In certain embodiments, the invention relates to the use of any one of the aforementioned compositions, or an alkyl phenolic resin made by any one of the aforementioned methods, as an adhesive, a dispersant, an elastomer, a coating, a paint, a thermoplastic elastomer, an ink component, a lubricant, or a rubber tackifier.

In certain embodiments, the invention relates to the use of any one of the aforementioned compositions, or an alkyl phenolic resin made by any one of the aforementioned methods, in an adhesive, a dispersant, an elastomer, a coating, a paint, a thermoplastic elastomer, an ink component, a lubricant, a rubber, or a rubber tackifier.

In certain embodiments, the invention relates to the use of any one of the aforementioned compositions, or an alkyl phenolic resin made by any one of the aforementioned methods, in the manufacture of an adhesive, a dispersant, an elastomer, a coating, a paint, a thermoplastic elastomer, an ink component, a lubricant, a rubber, or a rubber tackifier.

In certain embodiments, the invention relates to a rubber article, wherein the rubber article comprises (i) a rubber component, and (ii) any one of the aforementioned compositions or an alkyl phenolic resin made by any one of the aforementioned methods.

DETAILED DESCRIPTION

Overview

In certain embodiments, the invention relates to the surprising discovery that, during preparation of alkyl phenolic resins, by reducing the proportion of highly-branched 4-(1,1,3,3-tetramethylbutyl) phenol in the alkyl phenols, it is possible to reduce residual phenol while maintaining the application properties of the produced phenolic resin.

In certain embodiments, the invention relates to an alkyl phenolic resin with low content of residual phenol, good tackiness, and/or suitable softening point. In certain embodiments the alkyl phenolic resin of the invention has one or more of the following characteristics: no more than 2% w/w residual phenol, a softening point from about 85° C. to about 105° C., or a tackiness from about 8 N to about 25 N. In certain embodiments, the alkyl group of the alkyl phenol has 6-12 carbon atoms. In certain embodiments, the content of 4-(1,1,3,3-tetramethylbutyl) phenol in the alkyl phenol is from about 0% to about 85% w/w.

In certain embodiments, the invention relates to a method of preparing the alkyl phenolic resin. In certain embodiments, the method involves reacting an alkyl phenol and an arbitrarily selected phenol (0-10% w/w of total phenol) and aldehyde.

In certain embodiments, the invention relates to rubber compounds that contain the alkyl phenolic resin.

Definitions

As used herein, the terms "a," "an," "the," "one or more," and "at least one" are used interchangeably and include plural referents unless the context clearly dictates otherwise.

Unless defined otherwise, all scientific and technical terms are understood to have the same meaning as commonly used in the art to which they pertain. For the purpose of the present disclosure, additional specific terms are defined throughout.

The terms "comprises," "includes" and variations of these words do not have a limiting meaning where these terms appear in the description and claims. Thus, for example, a process that comprises "an" alkyl phenol can be interpreted to mean a process that includes "one or more" alkyl phenols. In addition, the term "comprising," which is synonymous with "including" or "containing," is inclusive, open-ended, and does not exclude additional un-recited elements or process steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "concentration" refers to a measure of an amount of a substance.

As used herein, the term "alkyl" means a saturated linear (i.e., straight chain), cyclic (i.e., cycloaliphatic), or branched monovalent hydrocarbon group including, e.g. methyl, ethyl, n-propyl, isopropyl, t-butyl, amyl, heptyl, dodecyl, octadecyl, 2-ethylhexyl, and the like.

As used herein, the term "alkylene" or "alkene" means an unsaturated, linear or branched monovalent hydrocarbon group with one or more olefinically unsaturated groups (i.e., carbon-carbon double bonds), such as a vinyl group.

Exemplary Methods

In certain embodiments, the invention relates to a method, comprising:

contacting a first phenol and a second phenol with an aldehyde at a first temperature for a first amount of time, thereby forming an alkyl phenolic resin, wherein the first phenol is an alkyl phenol;

the second phenol is different from the first phenol; and the second phenol is present in a concentration from about 0% to about 10% by weight of total phenol.

In certain embodiments, the invention relates to any one of the aforementioned methods, wherein the total phenol is the sum of the weights of the first phenol and the second phenol.

In certain embodiments, the invention relates to any one of the aforementioned methods, wherein the first phenol and the second phenol are contacted with the aldehyde in the presence of acidic catalyst. In certain embodiments, the invention relates to any one of the aforementioned methods, wherein the acidic catalyst is selected from the group consisting of sulfuric acid, hydrochloric acid, phosphoric acid, toluenesulfonic acid, xylenesulfonic acid, benzenesulfonic acid, benzene disulfonic acid, phenol sulfonic acid, C1-C15 alkyl benzene sulfonic acid (such as p-methylbenzene sulfonic acid), naphthalene sulfonic acid, and oxalic acid, or their mixture.

In certain embodiments, the invention relates to any one of the aforementioned methods, wherein the molar ratio of aldehyde-to-phenol is from about 0.8:1 to about 1.2:1. In certain embodiments, the invention relates to any one of the aforementioned methods, wherein the molar ratio of aldehyde-to-phenol is from about 0.8:1 to about 1:1. In certain embodiments, the invention relates to any one of the aforementioned methods, wherein the molar ratio of aldehyde-to-phenol is about 0.8:1, about 0.9:1, or about 1:1.

In certain embodiments, the invention relates to any one of the aforementioned methods, wherein the first temperature and the first amount of time are conditions sufficient to form an alkyl phenolic resin.

In certain embodiments, the invention relates to any one of the aforementioned methods, wherein the first phenol, the second phenol, and the aldehyde are contacted in the presence of a first solvent. In certain embodiments, the first solvent comprises water. In certain embodiments, the first solvent is water.

In certain embodiments, the invention relates to any one of the aforementioned methods, wherein the first temperature is the reflux temperature of the first phenol, the second phenol, and the aldehyde. In certain embodiments, the invention relates to any one of the aforementioned methods, wherein the first temperature is the reflux temperature of the first phenol, the second phenol, and the aldehyde in a first solvent. In certain embodiments, the first solvent comprises water.

In certain embodiments, the invention relates to any one of the aforementioned methods, wherein the first period of time is from about 1 h to about 3 h. In certain embodiments, the invention relates to any one of the aforementioned methods, wherein the first period of time is about 1 h, about 1.5 h, about 2 h, about 2.5 h, or about 3 h.

In certain embodiments, the invention relates to any one of the aforementioned methods, wherein the first temperature is from about 80° C. to about 120° C. In certain embodiments, the invention relates to any one of the aforementioned methods, wherein the first temperature is about 80° C., about 85° C., about 90° C., about 95° C., about 100° C., about 105° C., about 110° C., about 115° C., or about 120° C.

In certain embodiments, the invention relates to any one of the aforementioned methods, wherein the reaction of the first phenol, the second phenol, and the aldehyde results in a first reaction mixture. In certain embodiments, the invention relates to any one of the aforementioned methods, further comprising the step of distilling the first reaction mixture, thereby forming a second reaction mixture. In certain embodiments, the first reaction mixture is distilled for a period of time from about 0.5 h to about 2 h. In certain embodiments, the first reaction mixture is distilled for a period of time of about 0.5 h, about 1 h, about 1.5 h, or about 2 h. In certain embodiments, the first reaction mixture is distilled at a temperature of from about 130° C. to about 200° C. In certain embodiments, the first reaction mixture is distilled at a temperature of about 130° C., about 140° C., about 150° C., about 160° C., about 170° C., about 180° C., about 190° C., or about 200° C.

In certain embodiments, the invention relates to any one of the aforementioned methods, further comprising the step of adding a neutralizer to the second reaction mixture, thereby forming a third reaction mixture.

In certain embodiments, the invention relates to any one of the aforementioned methods, wherein the neutralizer is selected from the group consisting of: a hydroxide or a carbonate of an alkali metal or an alkaline earth metal, aqueous ammonia, and an amine. In certain embodiments, the invention relates to any one of the aforementioned methods, wherein the neutralizer is selected from the group consisting of sodium hydroxide, potassium hydroxide, calcium hydroxide, potassium carbonate, and sodium carbonate. In certain embodiments, the invention relates to any one of the aforementioned methods, wherein the neutralizer is selected from the group consisting of a C1-C6 alkyl amine, triethanolamine, diethanolamine, triethylamine, 1,8-diazabicyclo(5,4,0)undec-7-ene (DBU), triethylenetetramine, diethylenetriamine, and tetraethylenepentamine, or their mixture.

In certain embodiments, the invention relates to any one of the aforementioned methods, further comprising the step of distilling the third reaction mixture. In certain embodiments, the third reaction mixture is distilled under negative pressure. In certain embodiments, the third reaction mixture is distilled at a negative pressure of from about 2 kPa to about 3 kPa.

In certain embodiments, the invention relates to any one of the aforementioned methods, wherein the aldehyde is selected from RCHO; and R is hydrogen or C1-C8 alkyl. In certain embodiments, the invention relates to any one of the aforementioned methods, wherein the aldehyde is selected from the group consisting of formaldehyde, acetaldehyde, n-butylaldehyde, n-pentaldehyde, n-hexylaldehyde, and heptyl aldehyde, formaldehyde trimer, acetaldehyde trimer, furaldehyde, benzaldehyde, and β-hydroxybutylaldehyde.

In certain embodiments, the invention relates to any one of the aforementioned methods, wherein the second phenol is selected from the group consisting of phenol, m-dihydroxybenzene, and xylenol.

In certain embodiments, the invention relates to any one of the aforementioned methods, wherein the alkyl phenol is commercially acquired.

In certain embodiments, the invention relates to any one of the aforementioned methods, further comprising the step of preparing the alkyl phenol.

In certain embodiments, the invention relates to any one of the aforementioned methods, wherein the alkyl phenol is prepared by alkylation of phenol using a monoalkene.

In certain embodiments, the invention relates to any one of the aforementioned methods, wherein the alkylation of phenol is carried out at a second temperature for a second period of time. In certain embodiments, the second temperature is from about 80° C. to about 100° C. In certain embodiments, the second temperature is about 80° C., about 85° C., about 90° C., about 95° C., or about 100° C. In certain embodiments, the second period of time is from about 2.5 h to about 10 h. In certain embodiments, the second period of time is about 2.5 h, about 3 h, about 3.5 h, about 4 h, about 4.5 h, about 5 h, about 5.5 h, about 6 h, about 6.5 h, about 7 h, about 7.5 h, about 8 h, about 8.5 h, about 9 h, about 9.5 h, or about 10 h. In certain embodiments, the invention relates to any one of the aforementioned methods, wherein the molar ratio of monoalkene-to-phenol is from about 2:1 to about 1:1. In certain embodiments, the molar ratio of monoalkene-to-phenol is about 2:1, about 1.9:1, about 1.8:1, about 1.7:1, about 1.6:1, about 1.5:1, about 1.4:1, about 1.3:1, about 1.2:1, about 1.1:1, or about 1:1.

In certain embodiments, the invention relates to any one of the aforementioned methods, wherein the reaction between phenol and the monoalkene is carried out in the presence of an alkylation catalyst. In certain embodiments, the invention relates to any one of the aforementioned methods, wherein the reaction between phenol and the monoalkene is carried out in the presence of an alkylation catalyst; and the alkylation catalyst is an ion exchange resin or an activated clay-phosphoric acid. In certain embodiments, the invention relates to any one of the aforementioned methods, wherein the ion exchange resin is an acidic ion exchange resin. In certain embodiments, the invention relates to any one of the aforementioned methods, wherein the ion exchange resin is a strongly acidic ion exchange resin.

In certain embodiments, the invention relates to any one of the aforementioned methods, wherein the reaction between phenol and the monoalkene is carried out in the presence of an alkylation catalyst; and from about 2 parts to about 10 parts (w/w) of alkylation catalyst are used for every 100 parts phenol. In certain embodiments, the invention relates to any one of the aforementioned methods, wherein the reaction between phenol and the monoalkene is carried out in the presence of an alkylation catalyst; and about 2 parts, about 3 parts, about 4 parts, about 5 parts, about 6 parts, about 7 parts, about 8 parts, about 9 parts, or about 10 parts (w/w) of alkylation catalyst are used for every 100 parts phenol.

In certain embodiments, the invention relates to any one of the aforementioned methods, wherein the monoalkene is a monoalkene mixture. In certain embodiments, the invention relates to any one of the aforementioned methods, wherein the monoalkene comprises, consists essentially of, or consists of C6-C12 monoalkenes. In certain embodiments, the invention relates to any one of the aforementioned methods, wherein the monoalkene comprises, consists essentially of, or consists of C8-C10 monoalkenes. In certain embodiments, the invention relates to any one of the aforementioned methods, wherein the content of 2,4,4-trimethyl-1-pentene or 2,4,4-trimethyl-2-pentene in the monoalkene is from about 0% to about 85% w/w. In certain embodiments, the invention relates to any one of the aforementioned methods, wherein the content of 2,4,4-trimethyl-1-pentene or 2,4,4-trimethyl-2-pentene in the monoalkene is from about 2% to about 60% w/w. In certain embodiments, the invention relates to any one of the aforementioned methods, wherein the content of 2,4,4-trimethyl-1-pentene or 2,4,4-trimethyl-2-pentene in the monoalkene is from about 2% to about 40% w/w. In certain embodiments, the invention relates to any one of the aforementioned methods, wherein the content of 2,4,4-trimethyl-1-pentene or 2,4,4-trimethyl-2-pentene in the monoalkene is from about 5% to about 20% w/w. In certain embodiments, the invention relates to any one of the aforementioned methods, wherein the content of 2,4,4-trimethyl-1-pentene or 2,4,4-trimethyl-2-pentene in the monoalkene is about 4%, about 5%, about 6%, about 7%, about 8%, about 9%, about 10%, about 11%, about 12%, about 13%, about 14%, about 15%, about 16%, about 17%, about 18%, about 19%, or about 20% w/w. In certain embodiments, the monoalkene mixture contains only one monoalkene.

In certain embodiments, the invention relates to any one of the aforementioned methods, wherein the reaction between phenol and the monoalkene is carried out until from about 85% to about 100% w/w of the phenol is converted into alkyl phenol. In certain embodiments, the invention relates to any one of the aforementioned methods, wherein the reaction between phenol and the monoalkene is carried out until from about 90% to about 100% w/w of the phenol is converted into alkyl phenol. In certain embodiments, the invention relates to any one of the aforementioned methods, wherein the product of the reaction between phenol and the monoalkene is used to react with aldehyde to form alkyl phenolic resin. In certain embodiments, the invention relates to any one of the aforementioned methods, wherein the product of the reaction between phenol and the monoalkene is used, without purification, to react with aldehyde to form the alkyl phenolic resin.

In certain embodiments, the invention relates to any one of the aforementioned methods, further comprising the step of synthesizing the monoalkene. In certain embodiments, the invention relates to any one of the aforementioned methods, wherein the monoalkene is synthesized by non-selective polymerization. During non-selective polymerization, for example non-selective polymerization of C4 alkenes, highly-active catalyst is used at higher temperatures so that all butylenes react to obtain various octylene isomers. U.S. Pat. No. 4,334,118A describes the oligomerization (i.e., non-selective polymerization) of C3 -C12 alkenes. CN1058729A describes the catalyst and process parameters that can be applied to alkene polymerization. These openly-available publications are all cited herein as reference and hereby incorporated by reference in their entirety.

Main octylene components obtained through non-selective polymerization include 2,2-dimethyl-3-hexene, 2,4,4-trimethyl-1-pentene, 2,4,4-trimethyl-2-pentene, 3-isopropyl-1-pentene, 4,4-dimethyl-2-hexene, 2-isopropyl-1-pentene, 3,4,4-trimethyl-2-pentene, 2,3-dimethyl-3-hexene, 3-isopropyl-2-pentene, cis-2,3-dimethyl-2-hexene, 2-ethyl-3-hexene, 2,3,4-trimethyl-2-pentene, 2-ethyl-1-hexene, 3-methyl-3-heptylene, cis-2,3-dimethyl-3-hexene, 3-ethyl-2-hexene, and trans-2,3-dimethyl-3-hexene.

In certain embodiments, the invention relates to any one of the aforementioned methods, wherein the monoalkene comprises a C8 alkene; and the concentration of DIB (2,4,4-trimethyl-1-pentene and 2,4,4-trimethyl-2-pentene) in the C8 alkenes is from about 0% to about 1.5% w/w. In certain embodiments, the invention relates to any one of the aforementioned methods, wherein the monoalkene comprises a C8 alkene; and the concentration of DIB (2,4,4-trimethyl-1-pentene and 2,4,4-trimethyl-2-pentene) in the C8 alkenes is about 0%, about 0.5%, about 1%, or about 1.5% w/w.

In certain embodiments, the invention relates to any one of the aforementioned methods, wherein the monoalkene comprises octylene obtained through non-selective polymerization; and the octylene comprises multiple components with a lower degree of branching than DIB.

In certain embodiments, the invention relates to any one of the aforementioned methods, wherein the monoalkenes in the monoalkene mixture are selected from the group consisting of: 2,4,4-trimethyl-1-pentene, 2,4,4-trimethyl-2-pentene, octylene, nonylene, and dodecene. In certain embodiments, the invention relates to any one of the aforementioned methods, wherein the octylene was obtained through non-selective polymerization of C4 alkenes. In certain embodiments, the invention relates to any one of the aforementioned methods, wherein the nonylene was obtained through non-selective polymerization of C3 alkenes. In certain embodiments, the invention relates to any one of the aforementioned methods, wherein the dodecene was obtained through non-selective polymerization of C6 alkenes.

In certain embodiments, the invention relates to any one of the aforementioned methods, wherein the monoalkene other than 2,4,4-trimethyl-1-pentene and 2,4,4-trimethyl-2-pentene in the monoalkene mixture is octylene obtained through non-selective polymerization of a C4 alkene, in which the C4 alkene comprises isobutylene, 1-butylene, or 2-butylene.

In certain embodiments, the invention relates to any one of the aforementioned methods, wherein the non-selective polymerization is carried out in the presence of strong acid. In certain embodiments, the invention relates to any one of the aforementioned methods, wherein the non-selective polymerization is carried out in the presence of phosphoric acid. In certain embodiments, the invention relates to any one of the aforementioned methods, wherein the non-selective polymerization is carried out in the presence of solid phosphoric acid. In certain embodiments, the invention relates to any one of the aforementioned methods, wherein the non-selective polymerization is carried out in the presence of phosphoric acid loaded onto silicon dioxide.

In certain embodiments, the invention relates to any one of the aforementioned methods, wherein the non-selective polymerization is carried out at a third temperature. In certain embodiments, the third temperature is from about 160° C. to about 220° C. In certain embodiments, the third temperature is about 160° C., about 170° C., about 180° C., about 190° C., about 200° C., about 210° C., or about 220° C.

In certain embodiments, the invention relates to any one of the aforementioned methods, wherein the alkyl group of the alkyl phenol has from about 6 to about 12 carbon atoms. In certain embodiments, the invention relates to any one of the aforementioned methods, wherein the alkyl group of the alkyl phenol has about 6, about 7, about 8, about 9, about 10, about 11, or about 12 carbon atoms.

In certain embodiments, the invention relates to any one of the aforementioned methods, wherein the concentration of 4-(1,1,3,3-tetramethylbutyl) phenol in the alkyl phenol is from about 0% to about 85% w/w. In certain embodiments, the invention relates to any one of the aforementioned methods, wherein the concentration of 4-(1,1,3,3-tetramethylbutyl) phenol in the alkyl phenol is about 0%, about 5%, about 10%, about 15%, about 20%, about 25%, about 30%, about 35%, about 40%, about 45%, about 50%, about 55%, about 60%, about 65%, about 70%, about 75%, about 80%, or about 85% w/w.

In certain embodiments, the invention relates to an alkyl phenolic resin made by any one of the aforementioned methods.

Exemplary Compositions

In certain embodiments, the invention relates to a composition, wherein the composition consists essentially of a polycondensation product of (i) a first phenol and a second phenol with (ii) an aldehyde; the first phenol is an alkyl phenol; the second phenol is different from the first phenol; and the second phenol is present in a concentration from about 0% to about 10% by weight of total phenol.

In certain embodiments, the invention relates to any one of the aforementioned compositions, wherein the composition is an alkyl phenolic resin.

In certain embodiments, the invention relates to any one of the aforementioned compositions, wherein the aldehyde is selected from RCHO, wherein R is hydrogen or C1-C8 alkyl. In certain embodiments, the invention relates to any one of the aforementioned compositions, wherein the aldehyde is selected from the group consisting of formaldehyde, acetaldehyde, n-butylaldehyde, n-pentaldehyde, n-hexylaldehyde, heptyl aldehyde, formaldehyde trimer, acetaldehyde trimer, furaldehyde, benzaldehyde, and β-hydroxybutylaldehyde.

In certain embodiments, the invention relates to any one of the aforementioned compositions, wherein the composition comprises residual phenol in an amount of from about 0% to about 2% by weight. In certain embodiments, the invention relates to any one of the aforementioned compositions, wherein the composition comprises residual phenol in an amount of from about 0% to about 0.8% by weight. In certain embodiments, the invention relates to any one of the aforementioned compositions, wherein the composition comprises residual phenol in an amount of about 0%, about 0.1%, about 0.2%, about 0.3%, about 0.4%, about 0.5%, about 0.6%, about 0.7%, about 0.8%, about 0.9%, about 1%, about 1.5%, or about 2% by weight.

In certain embodiments, the invention relates to any one of the aforementioned compositions, wherein the composition has a softening point of about 85° C. to about 105° C. In certain embodiments, the invention relates to any one of the aforementioned compositions, wherein the composition has a softening point of about 95° C. to about 105° C. In certain embodiments, the invention relates to any one of the aforementioned compositions, wherein the composition has a softening point of about 95° C., about 100° C., or about 105° C. In certain embodiments, the invention relates to any one of the aforementioned compositions, wherein the softening point is measured according to ASTM D3461-97 (2007)).

In certain embodiments, the invention relates to any one of the aforementioned compositions, wherein the composition has a tackiness from about 8 N to about 25 N. In certain embodiments, the invention relates to any one of the aforementioned compositions, wherein the composition has a tackiness from about 9 N to about 20 N. In certain embodiments, the invention relates to any one of the aforementioned compositions, wherein the composition has a tackiness of about 9 N, about 10 N, about 11 N, about 12 N, about 13 N, about 14 N, about 15 N, about 16 N, about 17 N, about 18 N, about 19 N, or about 20 N. In certain embodiments, the invention relates to any one of the aforementioned compositions, wherein the tackiness is measured according to JIS T 9233-1997.

In certain embodiments, the invention relates to any one of the aforementioned compositions, wherein the alkyl group of the alkyl phenol has 6-12 carbon atoms. In certain embodiments, the invention relates to any one of the aforementioned compositions, wherein the alkyl group of the alkyl phenol has 8-10 carbon atoms. In certain embodiments, the invention relates to any one of the aforementioned compositions, wherein the alkyl phenol is hexyl phenol, heptyl phenol, octyl phenol, nonyl phenol, decyl phenol, undecyl phenol, dodecyl phenol or their isomers and mixtures. In certain embodiments, the invention relates to any one of the aforementioned compositions, wherein the alkyl phenol is octyl phenol, nonyl phenol, decyl phenol, or their isomers and mixtures.

In certain embodiments, the invention relates to any one of the aforementioned compositions, wherein the content of 4-(1,1,3,3-tetramethylbutyl) phenol in the alkyl phenol is from about 0% to about 85% w/w. In certain embodiments, the invention relates to any one of the aforementioned compositions, wherein the content of 4-(1,1,3,3-tetramethylbutyl) phenol in the alkyl phenol is from about 2% to about 60% w/w. In certain embodiments, the invention relates to any one of the aforementioned compositions, wherein the content of 4-(1,1,3,3-tetramethylbutyl) phenol in the alkyl phenol is from about 2% to about 40% w/w. In certain embodiments, the invention relates to any one of the aforementioned compositions, wherein the content of 4-(1,1,3,3-tetramethylbutyl) phenol in the alkyl phenol is from about 5% to about 20% w/w. In certain embodiments, the invention relates to any one of the aforementioned compositions, wherein the content of 4-(1,1,3,3-tetramethylbutyl) phenol in the alkyl phenol is about 5%, about 10%, about 15%, or about 20% w/w.

Exemplary Uses

In certain embodiments, the invention relates to the use of any one of the aforementioned alkyl phenolic resins, or the use of an alkyl phenolic resin made by any one of the aforementioned methods, as an adhesive, a dispersant, an elastomer, a coating, a paint, a thermoplastic elastomer, an ink component, a lubricant, or a rubber tackifier.

In certain embodiments, the invention relates to the use of any one of the aforementioned alkyl phenolic resins, or the use of an alkyl phenolic resin made by any one of the aforementioned methods, in an adhesive, a dispersant, an elastomer, a coating, a paint, a thermoplastic elastomer, an ink component, a lubricant, a rubber, or a rubber tackifier.

In certain embodiments, the invention relates to the use of any one of the aforementioned alkyl phenolic resins, or the use of an alkyl phenolic resin made by any one of the aforementioned methods, in the manufacture of an adhesive, a dispersant, an elastomer, a coating, a paint, a thermoplastic elastomer, an ink component, a lubricant, a rubber, or a rubber tackifier.

Exemplary Articles

In certain embodiments, the invention relates to a rubber article, wherein the rubber article comprises (i) a rubber component, and (ii) any one of the aforementioned alkyl phenolic resins or an alkyl phenolic resin made by any one of the aforementioned methods.

In certain embodiments, the invention relates to any one of the aforementioned rubber articles, wherein the rubber component comprises natural rubber, synthetic rubber, or their mixture. In certain embodiments, synthetic rubber comprises cis-1,4-polyisoprene, polybutadiene, polychlorobutadiene, isoprene/butadiene copolymer, acrylonitrile/butadiene copolymer, acrylonitrile/isoprene copolymer, styrene/butadiene/isoprene copolymer, butyl rubber, ethylene propylene diene (M-class) (EPDM) rubber, or styrene/butadiene copolymer.

In certain embodiments, the invention relates to any one of the aforementioned rubber articles, wherein the rubber article comprises the alkyl phenolic resin at a concentration from about 0.5 parts to about 7 parts/100 parts of rubber (w/w). In certain embodiments, the invention relates to any one of the aforementioned rubber articles, wherein the rubber article comprises the alkyl phenolic resin at a concentration from about 1 part to about 5 parts/100 parts of rubber (w/w). In certain embodiments, the invention relates to any one of the aforementioned rubber articles, wherein the rubber article comprises the alkyl phenolic resin at a concentration of about 1 part, about 1.5 parts, about 2 parts, about 2.5 parts, about 3 parts, about 3.5 parts, about 4 parts, about 4.5 parts, or about 5 parts per 100 parts of rubber (w/w).

In certain embodiments, the invention relates to any one of the aforementioned rubber articles, wherein the rubber article comprises a second resin. In certain embodiments, the invention relates to any one of the aforementioned rubber articles, wherein the rubber article comprises a second resin; and the second resin is not an alkyl phenolic resin.

Exemplary Embodiments

In certain embodiments, the invention relates to an alkyl phenolic resin, which is produced through the reaction between alkyl phenol and other arbitrarily selected phenol (0-10% w/w of total phenol) and aldehyde, in which, the content of residual phenol in the alkyl phenolic resin is no more than 2% w/w, the softening point is 85-105° C. (measured according to ASTM D3461-97(2007)), the tackiness is 8-25 N (measured according to JIS T 9233-1997), the alkyl group of the alkyl phenol has 6-12 carbon atoms, and the content of 4-(1,1,3,3-tetramethylbutyl) phenol in the alkyl phenol is 0-85% w/w.

In certain embodiments, the invention relates to any one of the aforementioned alkyl phenolic resins, wherein the content of residual phenol in the alkyl phenolic resin is no more than 1.5% w/w, no more than 1% w/w, or no more than 0.8% w/w.

In certain embodiments, the invention relates to any one of the aforementioned alkyl phenolic resins, wherein the content of 4-(1,1,3,3-tetramethylbutyl) phenol in the alkyl phenol is 2-60% w/w, 2-40% w/w, or 5-20% w/w.

In certain embodiments, the invention relates to any one of the aforementioned alkyl phenolic resins, wherein the alkyl group of the alkyl phenol has 8-10 carbon atoms.

In certain embodiments, the invention relates to any one of the aforementioned alkyl phenolic resins, wherein the alkyl phenol is prepared by alkylation of phenol using monoalkene, in which the monoalkene is C6-C12 monoalkene, or C8-C10 monoalkene; the content of 2,4,4-trimethyl-1-pentene and 2,4,4-trimethyl-2-pentene in the monoalkene is 0-85% w/w, 2-60% w/w, 2-40% w/w, or 5-20% w/w.

In certain embodiments, the invention relates to any one of the aforementioned alkyl phenolic resins, wherein the alkenes other than 2,4,4-trimethyl-1-pentene and 2,4,4-trimethyl-2-pentene in the monoalkene are selected from octylene obtained through non-selective polymerization of C4 alkenes, nonylene obtained through non-selective polymerization of C3 alkenes, and dodecene obtained through non-selective polymerization of C6 alkenes.

In certain embodiments, the invention relates to any one of the aforementioned alkyl phenolic resins, wherein the non-selective polymerization takes place under the conditions of strong acid and high temperature of 160-220° C.

In certain embodiments, the invention relates to any one of the aforementioned alkyl phenolic resins, wherein the alkenes other than 2,4,4-trimethyl-1-pentene and 2,4,4-trimethyl-2-pentene in the monoalkene is octylene obtained through non-selective polymerization of C4 alkene(s), in which the C4 alkene(s) is one or more of isobutylene, 1-butylene and 2-butylene.

In certain embodiments, the invention relates to any one of the aforementioned alkyl phenolic resins, wherein the alkylation of phenol with monoalkene is carried out in the presence of alkylation catalyst, and the catalyst is selected from strongly acidic ionic exchange resin and activated clay-phosphoric acid.

In certain embodiments, the invention relates to any one of the aforementioned alkyl phenolic resins, wherein the alkylation reaction is carried out until the conversion rate of phenol is above 85% w/w, or above 90% w/w, and the reaction product is used to react with aldehyde to form alkyl phenolic resin.

In certain embodiments, the invention relates to any one of the aforementioned alkyl phenolic resins, wherein the alkylation reaction between monoalkene and phenol is carried out at 80-100° C. and takes 2.5-10 hours; the monoalkene-phenol molar ratio is 2:1-1:1, in which 2-10 parts (w/w) of alkylation catalyst are used for every 100 parts of phenol.

In certain embodiments, the invention relates to any one of the aforementioned alkyl phenolic resins, wherein the aldehyde is selected from RCHO, in which R is hydrogen or alkyl with 1-8 carbon atoms, such as formaldehyde, acetaldehyde, n-butylaldehyde, n-pentaldehyde, n-hexylaldehyde and heptyl aldehyde, as well as formaldehyde oligomers, such as formaldehyde trimer, acetaldehyde trimer, furaldehyde, benzaldehyde and β-hydroxybutylaldehyde; the other phenol is selected from phenol, m-dihydroxybenzene, and xylenol.

In certain embodiments, the invention relates to any one of the aforementioned alkyl phenolic resins, wherein the aldehyde-phenol molar ratio is 0.8:1-1.2:1, or 0.8:1-1:1.

In certain embodiments, the invention relates to any one of the aforementioned alkyl phenolic resins, wherein the softening point of the alkyl phenolic resin is 95-105° C. (measured according to ASTM D3461-97(2007)).

In certain embodiments, the invention relates to any one of the aforementioned alkyl phenolic resins, wherein the tackiness of the alkyl phenolic resin is 9-20 N (measured according to JIS T 9233-1997).

In certain embodiments, the invention relates to a method of preparing any one of the aforementioned alkyl phenolic resins, wherein the resin is produced through the reaction between alkyl phenol and other arbitrarily selected phenol (0-10% w/w of total phenol) and aldehyde, in which the alkyl group of the alkyl phenol has 6-12 carbon atoms, and the content of 4-(1,1,3,3-tetramethylbutyl) phenol in the alkyl phenol is 0-85% w/w.

In certain embodiments, the invention relates to any one of the aforementioned methods, wherein the reaction is carried out in the presence of acidic catalyst, in which the acidic catalyst is one of sulfuric acid, hydrochloric acid, phosphoric acid, toluenesulfonic acid, xylenesulfonic acid, benzenesulfonic acid, benzene disulfonic acid, phenol sulfonic acid, C1-C15 alkyl benzene sulfonic acid (such as p-methylbenzene sulfonic acid), naphthalene sulfonic acid and oxalic acid or their mixture.

In certain embodiments, the invention relates to any one of the aforementioned methods, wherein the aldehyde-phenol molar ratio is 0.8:1-1.2:1, or 0.8:1-1:1.

In certain embodiments, the invention relates to any one of the aforementioned methods, wherein the phenol and aldehyde are reflux-reacted for 1-3 hours at 80-120° C. in the presence of acidic catalyst, then the reflux condition is changed to distillation condition, and the reactants react for 0.5-2 hours at 130-200° C., then neutralizer is added to neutralize the catalyst, and finally distill under 2-3 kPa of negative pressure to obtain alkyl phenolic resin.

In certain embodiments, the invention relates to the use of any one of the aforementioned alkyl phenolic resins in adhesive, dispersant, elastomer, coating, painting, thermoplastic elastomer, ink component and lubricant, or the usage as rubber tackifier.

In certain embodiments, the invention relates to a rubber compound, which contains natural rubber, synthetic rubber or their mixture, and any one of the aforementioned alkyl phenolic resins.

EXEMPLIFICATION

The invention now being generally described, it will be more readily understood by reference to the following examples which are included merely for purposes of illustration of certain aspects and embodiments of the present invention, and are not intended to limit the invention.

General Materials and Methods

The C8 alkene used in Examples 1 to 5 was obtained through non-selective polymerization of C4 alkene. The non-selective polymerization process used as raw material the mixture of 54.8% (w/w) of 1-butylene, 16.5% (w/w) of 2-butylene, 1.5% (w/w) of isobutylene, 23% (w/w) of butane, and 4.2% (w/w) of other hydrocarbons. The polymerization was carried out at 180-220° C. in the presence of solid phosphoric acid catalyst (i.e., phosphoric acid loaded onto silicon dioxide). Then, the mixture of the reaction products was rectified to obtain C8 alkene, the main components of which included:

| Molecular structure | % w/w |
|---|---|
| 2,2-dimethyl-3-hexene | 3.60 |
| 3,4,4-trimethyl-1-pentene | 2.17 |
| trans-5,5-dimethyl-1-hexene | 0.93 |
| 2,4,4-trimethyl-2-pentene | 1.24 |
| 3-isopropyl-1-pentene | 9.80 |
| trans-2,4-dimethyl-3-hexene | 4.19 |
| 4,4-dimethyl-2-hexene | 10.74 |
| 2-isopropyl-1-pentene | 2.02 |
| 2,3,4-trimethyl-1-pentene | 2.24 |
| 2,3-dimethyl-1-hexene | 1.21 |
| 3,4,4-trimethyl-2-pentene | 7.60 |
| 2,3-dimethyl-3-hexene | 12.52 |
| 3-isopropyl-2-pentene | 6.08 |
| 3,5-dimethyl-2-hexene | 0.73 |
| 2-ethyl-3-hexene | 6.47 |
| 2,3,4-trimethyl-2-pentene | 14.32 |
| 2-ethyl-1-hexene | 0.49 |
| 3-methyl-3-heptylene | 0.37 |
| cis-2,3-dimethyl-3-hexene | 3.07 |
| 3-ethyl-2-hexene | 2.41 |
| trans-2,3-dimethyl-3-hexene | 6.84 |

DIB was supplied by Chemiway Maruzen Petrochemical (Japan), with purity over 97%.

Nonylphenol was purchased from Beijing Chemical Reagent Corp., with purity over 99%.

The apparatus used to measure softening point was a Mettler Toledo FP90 calorific value analysis system +FP83HT (Mettler Toledo).

PTOP-formaldehyde resin ("203 resin") was supplied by Wuhan Jinghe. Its softening point was 99° C., and it had 3.87% w/w free phenol.

PTOP was purchased from Shandong Luhua Haoyuan Chemical Co., Ltd., with purity over 95% w/w.

The molecular weights of polymers were measured by a Waters 2695 GPC system (Waters, US) with a Waters 2414 detector (solvent: THF; flow rate: 1.0 mL/min; column temperature: 35° C.; GPC column: HR3+HR1+HR0.5).

The content of free phenol was measured by a Waters 2695 HPLC 2996PPA (solvent: THF+water+methanol; flow rate: 1.0 mL/min; temperature: 30° C.; column: Waters Sunfire C18, 250 mm×4.6 mm).

All molecular weights, including number average and weight average molecular weights, unless otherwise indicated, are "g/mol."

Example 1

In a 500-mL four-neck round-bottom flask mounted with mechanical stirrer, thermometer, reflux condenser and dropping funnel, add 94 g of phenol and 4.7 g of ionic exchange resin (Rohm and Haas, Amberlyst A-15, 5% of phenol weight); heat up to 85° C. while stirring; add 112 g of mixed octylene [mixture of C8 alkene (20% w/w) and DIB (80% w/w)] with dropping funnel; control the dropping speed so it completes in about 2 hours, and maintain the reaction temperature at 90° C.; after completion of dropping, keep reacting for 3 hours at 90° C.; GC analysis reveals that the reaction solution contains alkyl phenol (88.09% w/w), alkene (7.82% w/w) and unreacted phenol. At 160-170° C., distill to obtain unreacted alkene, and separate alkyl phenol 1; in the alkyl phenol 1, the content of octylphenol is 84.6% w/w, in which the content of PTOP is 68% w/w; furthermore, the content of dioctyl phenol is 12.2% w/w, in addition to small amounts of dodecylphenol, phenol, etc.

Example 2

In a 500-mL four-neck round-bottom flask mounted with mechanical stirrer, thermometer, reflux condenser and dropping funnel, add 94 g of phenol and 4.7 g of ionic exchange resin (Rohm and Haas, Amberlyst A-15, 5% of phenol weight); heat up to 85° C. while stirring; add 117.6 g of mixed octylene [mixture of C8 alkene (40% w/w) and DIB (60% w/w)] with dropping funnel; control the dropping speed so it completes in about 2 hours, and maintain the reaction temperature at 90° C.; after completion of dropping, keep reacting for 3 hours at 90° C.; GC analysis reveals that the reaction solution contains alkyl phenol (86.15% w/w), alkene (9.33% w/w) and unreacted phenol. At 160-170° C., distill to obtain unreacted alkene, and separate alkyl phenol 2; in the alkyl phenol 2, the content of octylphenol is 77.4% w/w, in which the content of PTOP is 54.5% w/w; furthermore, the content of dioctyl phenol is 17.8% w/w, in addition to small amounts of dodecylphenol, phenol, etc.

Example 3

In a 500-mL four-neck round-bottom flask mounted with mechanical stirrer, thermometer, reflux condenser and dropping funnel, add 94 g of phenol and 4.7 g of ionic exchange resin (Rohm and Haas, Amberlyst A-15, 5% of phenol weight); heat up to 85° C. while stirring; add 123g of mixed octylene [mixture of C8 alkene (60% w/w) and DIB (40% w/w)] with dropping funnel; control the dropping speed so it completes in about 1 hours, and maintain the reaction temperature at 90° C.; after completion of dropping, keep reacting for 3 hours at 90° C.; GC analysis reveals that the reaction solution contains alkyl phenol (86.2% w/w), alkene (10.25% w/w) and unreacted phenol. At 160-170° C., distill to obtain unreacted alkene, and separate alkyl phenol 3; in the alkyl phenol 3, the content of octylphenol is 66.6% w/w, in which the content of PTOP is 33.4% w/w; furthermore, the content of dioctyl phenol is 26.4% w/w, in addition to small amounts of dodecylphenol, phenol, etc.

Example 4

In a 500-mL four-neck round-bottom flask mounted with mechanical stirrer, thermometer, reflux condenser and dropping funnel, add 94 g of phenol and 4.7 g of ionic exchange resin (Rohm and Haas, Amberlyst A-15, 5% of phenol weight); heat up to 85° C. while stirring; add 134g of mixed octylene [mixture of C8 alkene (80% w/w) and DIB (20% w/w)] with dropping funnel; control the dropping speed so it completes in about 1 hours, and maintain the reaction temperature at 90° C.; after completion of dropping, keep reacting for 3 hours at 90° C.; GC analysis reveals that the reaction solution contains alkyl phenol (82.86% w/w), alkene (13.04% w/w) and unreacted phenol. At 160-170° C., distill to obtain unreacted alkene, and separate alkyl phenol 4; in the alkyl phenol 4, the content of octylphenol is 61.2% w/w, in which the content of PTOP is 15.0% w/w; furthermore, the content of dioctyl phenol is 31.6% w/w, in addition to small amounts of dodecylphenol, phenol, etc.

Example 5

In a 500-mL four-neck round-bottom flask mounted with mechanical stirrer, thermometer, reflux condenser and dropping funnel, add 94 g of phenol and 4.7 g of ionic exchange resin (Rohm and Haas, Amberlyst A-15, 5% of phenol weight); heat up to 85° C. while stirring; add 145 g of C8 alkene with dropping funnel; control the dropping speed so it completes in about 1 hour, and maintain the reaction temperature at 90° C.; after completion of dropping, keep reacting for 3 hours at 90° C.; GC analysis reveals that the reaction solution contains alkyl phenol (80.57% w/w), alkene (16.23% w/w) and unreacted phenol. At 160-170° C., distill to obtain unreacted alkene, and separate alkyl phenol 5; in the alkyl phenol 5, the content of octylphenol is 55.0% w/w, in which the content of PTOP is 1.51% w/w; furthermore, the content of dioctyl phenol is 36.3% w/w, in addition to small amounts of dodecylphenol, phenol, etc.

Example 6

In a 500-mL four-neck round-bottom flask mounted with mechanical stirrer, thermometer, reflux condenser and dropping funnel, add 103 g (0.5 mole) of alkyl phenol 1 obtained from Example 1 and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 33.6 g (0.415 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)undec-7-ene (DBU) to neutralize the catalyst; after reacting for 15 minutes while stirring, slowly turn on the vacuum to reach maximum vacuum (2.5 kPa) and maintain for 30 minutes to obtain alkyl phenolic resin 1. Pour out the resultant alkyl phenolic resin, cool and weigh; the yield is 95.3%. The softening point of this resin measured according to ASTM D3461-97 (2007) is 100.5° C. The content of free alkyl phenol monomer in the resin measured by HPLC is 1.01% w/w. The number-average molecular weight measured by GPC is 950, and the weight-average molecular weight is 1411.

Example 7

In a 500-mL four-neck round-bottom flask mounted with mechanical stirrer, thermometer, reflux condenser and dropping funnel, add 103 g (0.5 mole) of alkyl phenol 2 obtained from Example 2 and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 33.6 g (0.415 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of triethanolamine to neutralize the catalyst; after reacting for 15 minutes while stirring, slowly turn on the vacuum to reach maximum vacuum (2.5 kPa) and maintain for 30 minutes to obtain alkyl phenolic resin 2. Pour out the resultant alkyl phenolic resin, cool and weigh; the yield is 94.8%. The softening point of this resin measured according to ASTM D3461-97 (2007) is 93° C. The content of free alkyl phenol monomer in the resin measured by HPLC is 1.69% w/w. The number-average molecular weight measured by GPC is 928, and the weight-average molecular weight is 1519.

Example 8

In a 500-mL four-neck round-bottom flask mounted with mechanical stirrer, thermometer, reflux condenser and dropping funnel, add 103 g (0.5 mole) of alkyl phenol 3 obtained from Example 3 and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 33.6 g (0.415 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of triethanolamine to neutralize the catalyst; after reacting for 15 minutes while stirring, slowly turn on the vacuum to reach maximum vacuum (2.5 kPa) and maintain for 30 minutes to obtain alkyl phenolic resin 3. Pour out the resultant alkyl phenolic resin, cool and weigh; the yield is 95.2%. The softening point of this resin measured according to ASTM D3461-97 (2007) is 96.3° C. The content of free alkyl phenol monomer in the resin measured by HPLC is 0.66% w/w. The number-average molecular weight measured by GPC is 1011, and the weight-average molecular weight is 1657.

Example 9

In a 500-mL four-neck round-bottom flask mounted with mechanical stirrer, thermometer, reflux condenser and dropping funnel, add 103 g (0.5 mole) of alkyl phenol 4 obtained from Example 4 and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 33.6 g (0.415 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12g of triethanolamine to neutralize the catalyst; after reacting for 15 minutes while stirring, slowly turn on the vacuum to reach maximum vacuum (2.5 kPa) and maintain for 30 minutes to obtain alkyl phenolic resin 4. Pour out the resultant alkyl phenolic resin, cool and weigh; the yield is 96%. The softening point of this resin measured according to ASTM D3461-97 (2007) is 92.5° C. The content of free alkyl phenol monomer in the resin measured by HPLC is 0.34% w/w. The number-average molecular weight measured by GPC is 1075, and the weight-average molecular weight is 1812.

Example 10

In a 500-mL four-neck round-bottom flask mounted with mechanical stirrer, thermometer, reflux condenser and dropping funnel, add 103 g (0.5 mole) of alkyl phenol 5 obtained from Example 5 and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 33.6 g (0.415 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)undec-7-ene (DBU) to neutralize the catalyst; after reacting for 15 minutes while stirring, slowly turn on the vacuum to reach maximum vacuum (2.5 kPa) and maintain for 30 minutes to obtain alkyl phenolic resin 5. Pour out the resultant alkyl phenolic resin, cool and weigh; the yield is 94.7%. The softening point of this resin measured according to ASTM D3461-97 (2007) is 96.3° C. The content of free alkyl phenol monomer in the resin measured by HPLC is 0.30% w/w. The number-average molecular weight measured by GPC is 1155, and the weight-average molecular weight is 2208.

Comparative Example 1

In a 500-mL four-neck round-bottom flask mounted with mechanical stirrer, thermometer, reflux condenser and dropping funnel, add 103 g (0.5 mole) of PTOP and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 32.4 g (0.4 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)undec-7-ene (DBU) to neutralize the catalyst; after reacting for 15 minutes while stirring, slowly turn on the vacuum to reach maximum vacuum (2.5 kPa) and maintain for 30 minutes to obtain alkyl phenolic resin C. Pour out the resultant resin, cool and weigh; the yield is 96.8%. The softening point of this resin measured according to ASTM D3461-97 (2007) is 96.0° C. The content of free alkyl phenol monomer in the resin measured by HPLC is 3.29% w/w. The number-average molecular weight measured by GPC is 834, and the weight-average molecular weight is 1399.

Comparative Example 2

In a 500-mL four-neck round-bottom flask mounted with mechanical stirrer, thermometer, reflux condenser and dropping funnel, add 103 g (0.5 mole) of PTOP and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 36.5 g (0.45 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)undec-7-ene (DBU) to neutralize the catalyst; after reacting for 15 minutes while stirring, slowly turn on the vacuum to reach maximum vacuum (2.5 kPa) and maintain for 30 minutes. Pour out the resultant resin, cool and weigh; the yield is 97.7%. The softening point of this resin measured according to ASTM D3461-97 (2007) is 131.6° C. The content of free alkyl phenol monomer in the resin measured by HPLC is 0.46% w/w. The number-average molecular weight measured by GPC is 1774, and the weight-average molecular weight is 4488.

In Comparative Example 2, the content of free alkyl phenol monomer in the resin is reduced by increasing the use level of formaldehyde, however the softening point of the resultant resin is as high as 131.6° C., which exceeds the range of normal octyl phenolic tackifying resin, and is detrimental to the mixing of the resin with rubber.

Example 11

In a 500-mL four-neck round-bottom flask mounted with mechanical stirrer, thermometer, reflux condenser and dropping funnel, add 20.6 g (0.1 mole) of PTOP, 88 g (0.4 mole) of nonylphenol and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 36 g (0.444 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)undec-7-ene (DBU) to neutralize the catalyst; after reacting for 15 minutes while stirring, slowly turn on the vacuum to reach maximum vacuum (2.5 kPa) and maintain for 30 minutes to obtain alkyl phenolic resin 6. Pour out the resultant resin, cool and weigh; the yield is 97.6%. The softening point of this resin measured according to ASTM D3461-97 (2007) is 99° C. The content of free alkyl phenol monomer in the resin measured by HPLC is 0.25% w/w. The number-average molecular weight measured by GPC is 1691, and the weight-average molecular weight is 2264.

Example 12

In a 500-mL four-neck round-bottom flask mounted with mechanical stirrer, thermometer, reflux condenser and dropping funnel, add 41.2 g (0.2 mole) of PTOP, 66 g (0.3 mole) of nonylphenol and 0.15 g of linear alkyl benzene sulfonic acid (catalyst, Nanjing Jiahe Household Chemical Co., Ltd., with content of C9-C14 alkyl benzene sulfonic acid no less than 97% w/w); heat up the mixture to 100° C. When the temperature reaches 95° C., start to drop 35 g (0.432 mole) of aqueous formaldehyde (37% w/w) for 30 minutes, upon completion of dropping, reflux-react for 120 minutes. Then change the condenser from reflux condition to distillation condition, and heat up the reactants to 130-135° C.; maintain this temperature and react for 1 hour while stirring, then heat up to 180° C. Then add 0.12 g of 1,8-diazabicyclo(5,4,0)

undec-7-ene (DBU) to neutralize the catalyst; after reacting for 15 minutes while stirring, slowly turn on the vacuum to reach maximum vacuum (2.5 kPa) and maintain for 30 minutes to obtain alkyl phenolic resin 7. Pour out the resultant resin, cool and weigh; the yield is 98.5%. The softening point of this resin measured according to ASTM D3461-97 (2007) is 98.7° C. The content of free alkyl phenol monomer in the resin measured by HPLC is 0.89% w/w. The number-average molecular weight measured by GPC is 1407, and the weight-average molecular weight is 1890.

Example 13

In the mixture of natural rubber (Standard Malaysian Rubber, SMR20) and synthetic butadiene rubber (from Beijing Yanshan Petrochemical Co., Ltd., BR9000), evaluate the performance of the alkyl phenolic resin from Examples 6 to 12 of this invention, alkyl phenolic resin from Comparative Example 1 and commercially available 203 resin as tackifying resin.

The tackiness is measured according to JIS T 9233-1997. Formulation of rubber compound is shown in Table 1.

TABLE 1

Formulation of rubber compound.

| Component | Part (by weight) |
|---|---|
| Natural rubber | 30.0 |
| Butadiene rubber | 70.0 |
| Carbon black (N375) | 80.0 |
| Operating oil | 4.0 |
| Stearic acid | 2.0 |
| Zinc oxide | 3.0 |
| Sulfur | 1.0 |
| Sulfenamide (NS) | 2.2 |
| Poly(1,2-dihydro-2,2,4-trimethyl-quinoline) (TMQ) | 1.5 |
| N-(1,2-Dimethylbutyl)-N'-phenyl-p-phenylenediamine (4020) | 1.6 |
| Tackifying resin | 4.0 |

Step 1: Mix butadiene rubber, natural rubber, carbon black, operating oil, stearic acid and zinc oxide at 150° C. in a banbury mixer to obtain masterbatch; Step 2: In certain amount of masterbatch, separately add resin of this invention from Examples 6 to 12 (alkyl phenolic resin 1, 2, 3, 4, 5, 6 and 7), resin from Comparative Example 1 (alkyl phenolic resin C) and commercially-available 203 resin as tackifying resin, and also add anti-aging agent TMQ and 4020, and mix at 140° C. in a banbury mixer; Step 3: Add sulfur and NS to the rubber stock obtained in Step 2, mix and press in an open mill to obtain rubber sheets 1, 2, 3, 4, 5, 6, 7, C and 203. Store these rubber sheets under 23° C. and 50% RH. Measure the tackiness (in N) after 24, 48 and 72 hours of storage respectively. The tackiness is measured by P-2 tackiness tester (Toyoseiki, Japan). The tackiness results of rubber sheets using different tackifying resins are listed in Table 2.

After the sheets are left for 24 hours, measure their vulcanization characteristics, the result of which is shown in Table 3. Apparatus used include rotorless curemeter and Mooney viscometer (AFA Technologies, US). Vulcanize the rubber sheet samples on pate vulcanizer. Test the physical and mechanical properties of the vulcanized rubber before and after aging. Aging of vulcanized rubber is measured by GBT3512-2001 method, in which the vulcanized rubber sheets are placed in hot air aging oven at 100° C. for 24 hours, then removed for physical and mechanical property test, the result of which is shown in Table 4.

TABLE 2

Tackiness results.

| Rubber sheet | Tackiness after 24 hours (N) | Tackiness after 48 hours (N) | Tackiness after 72 hours (N) |
|---|---|---|---|
| Rubber sheet 1 | 10.74 | 9.23 | 8.95 |
| Rubber sheet 2 | 11.39 | 12.68 | 9.33 |
| Rubber sheet 3 | 11.45 | 10.70 | 11.15 |
| Rubber sheet 4 | 14.45 | 10.50 | 12.50 |
| Rubber sheet 5 | 15.97 | 11.10 | 10.83 |
| Rubber sheet 6 | 10.57 | 8.85 | 8.65 |
| Rubber sheet 7 | 10.91 | 10.50 | 9.35 |
| Rubber sheet C | 11.1 | 10.6 | 8.3 |
| Rubber sheet 203 | 11.05 | 9.95 | 8.95 |

TABLE 3

Vulcanization characteristics of rubber sheet.

| | Rubber sheet 4 | Rubber sheet 203 |
|---|---|---|
| Mooney viscosity | | |
| MS(1 + 4)/100° C. | 48.96 | 47.97 |
| MS(1 + 8)/100° C. | 46.62 | 45.24 |
| Scorching time (127° C.) | | |
| Ts2 | 15:57 | 16:17 |
| Ts5 | 17:44 | 17:19 |
| Vulcanization characteristics (160 × 30 min ° C.) | | |
| T10 | 04:28 | 04:16 |
| T50 | 06:06 | 06:00 |
| T90 | 08:51 | 10:27 |
| ML | 3.34 | 3.38 |
| MH | 22.66 | 21.34 |

TABLE 4

Physical and mechanical properties of vulcanized rubber sheet.

| | Rubber sheet 4 | Rubber sheet 203 |
|---|---|---|
| Physical and mechanical properties before aging | | |
| 50% modulus, MPa | 2.61 | 2.38 |
| 100% modulus, MPa | 4.88 | 4.44 |
| Tensile strength, MPa | 20.96 | 21.17 |
| Elongation at break, % | 281 | 292 |
| Physical and mechanical properties after aging, 100° C., 24 h | | |
| 50% modulus, MPa | 3.45 | 3.04 |
| 100% modulus, MPa | 6.68 | 5.86 |
| Tensile strength, MPa | 20.17 | 19.92 |
| Elongation at break, % | 225 | 244 |

The aforementioned data shows that, the alkyl phenolic resin of this invention has low content of residual phenol, while maintaining excellent tackiness, as well as processing performance and mechanical properties substantially similar to commercial products.

REFERENCES

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

EQUIVALENTS

Although the embodiments of this invention have been described as above for the purpose of elucidation, without departing from the scope of this invention, it will be apparent to those skilled in the art that various modifications and variation can be made to this invention.

The invention claimed is:

1. A method, comprising:
   providing an alkyl phenol mixture comprising an alkyl phenol and a second phenol, and
   reacting the alkyl phenol mixture with an aldehyde to form an alkyl phenolic resin in the absence of a fatty acid,
   wherein the second phenol is different from the alkyl phenol; and
   the second phenol is present in a concentration from about 3.2% to about 10% by weight of the alkyl phenol mixture.

2. The method of claim 1, wherein the second phenol is phenol.

3. The method of claim 1, wherein the second phenol is selected from the group consisting of phenol, m-dihydroxybenzene, and xylenol.

4. The method of claim 1, wherein the aldehyde is selected from RCHO, wherein R is C1-C8 alkyl.

5. The method of claim 1, wherein the alkyl group of the alkyl phenol has 6-12 carbon atoms.

6. The method of claim 1, wherein the content of 4-(1,1,3,3-tetramethylbutyl)phenol in the alkyl phenol is from about 0% to about 85% w/w.

7. The method of claim 1, wherein the alkyl phenol mixture comprises a para-alkylphenol.

8. The method of claim 1, wherein the alkyl phenol mixture comprises para-tert-octyl phenol.

9. A method, comprising:
   providing an alkyl phenol mixture comprising an alkyl phenol and a second phenol, and
   reacting the alkyl phenol mixture with an aldehyde to form an alkyl phenolic resin,
   wherein the second phenol is different from the alkyl phenol; and
   the second phenol is present in a concentration from about 3.2% up to about 10% by weight of the alkyl phenol mixture,
   and the alkyl phenolic resin consists essentially of a polycondensation product of the alkyl phenol mixture and the aldehyde.

10. A method, consisting essentially of:
    providing an alkyl phenol mixture consisting essentially of an alkyl phenol and a second phenol, and
    reacting the alkyl phenol mixture with an aldehyde to form an alkyl phenolic resin,
    wherein the second phenol is different from the alkyl phenol; and
    the second phenol is present in a concentration from about 3.2% up to about 10% by weight of the alkyl phenol mixture.

* * * * *